United States Patent [19]

Sims

[11] Patent Number: 5,160,120
[45] Date of Patent: Nov. 3, 1992

[54] SELF RETRACTING PORTABLE CATTLE GUARD

[76] Inventor: Cecil R. Sims, 2311 W. Relation St., Safford, Ariz. 85546

[21] Appl. No.: 644,775

[22] Filed: Jan. 23, 1991

Related U.S. Application Data

[63] Continuation-in-part of Ser. No. 430,009, Nov. 1, 1989, abandoned.

[51] Int. Cl.⁵ .................................................. A01K 3/00
[52] U.S. Cl. ........................................ 256/17; 256/14; 49/131; 160/290.1
[58] Field of Search ................................ 256/14–18, 256/40, 41, 24, 25, 1; 49/58, 131, 132; 160/133, 290.1, 313, 23.1

[56] References Cited

U.S. PATENT DOCUMENTS

| | | | |
|---|---|---|---|
| 832,335 | 10/1906 | McDonald | 160/290.1 X |
| 1,424,375 | 8/1922 | Palt | 160/290.1 |
| 2,100,976 | 11/1937 | Norton | 160/133 X |
| 2,512,740 | 6/1950 | Evans | 49/131 X |
| 2,539,214 | 1/1951 | Warner | |
| 2,710,173 | 6/1955 | Manuel | |
| 2,790,626 | 4/1957 | Harford | |
| 2,800,304 | 7/1957 | Van Alsburg | |
| 2,846,194 | 8/1958 | Wells | 256/14 |
| 2,899,174 | 8/1959 | Wells | 256/14 X |
| 3,065,785 | 11/1962 | Taker | 160/290.1 X |

Primary Examiner—Peter M. Cuomo
Attorney, Agent, or Firm—Henderson & Sturm

[57] ABSTRACT

A self retracting portable cattle guard (100) for connection between the gate posts (50, 50') in a gate opening and including a spring loaded reel mechanism (110) secured to one post (50) and provided with a flexible grid (120) having a cross bar (15) equipped with hooks (22) that are adapted to releasably engage an anchor assembly (130) attached to the other post (50'). The spring biased reel mechanism (110) will retract and rotatably store the grid (120) when the hooks (22) are disengaged from the anchor assembly (130).

2 Claims, 5 Drawing Sheets

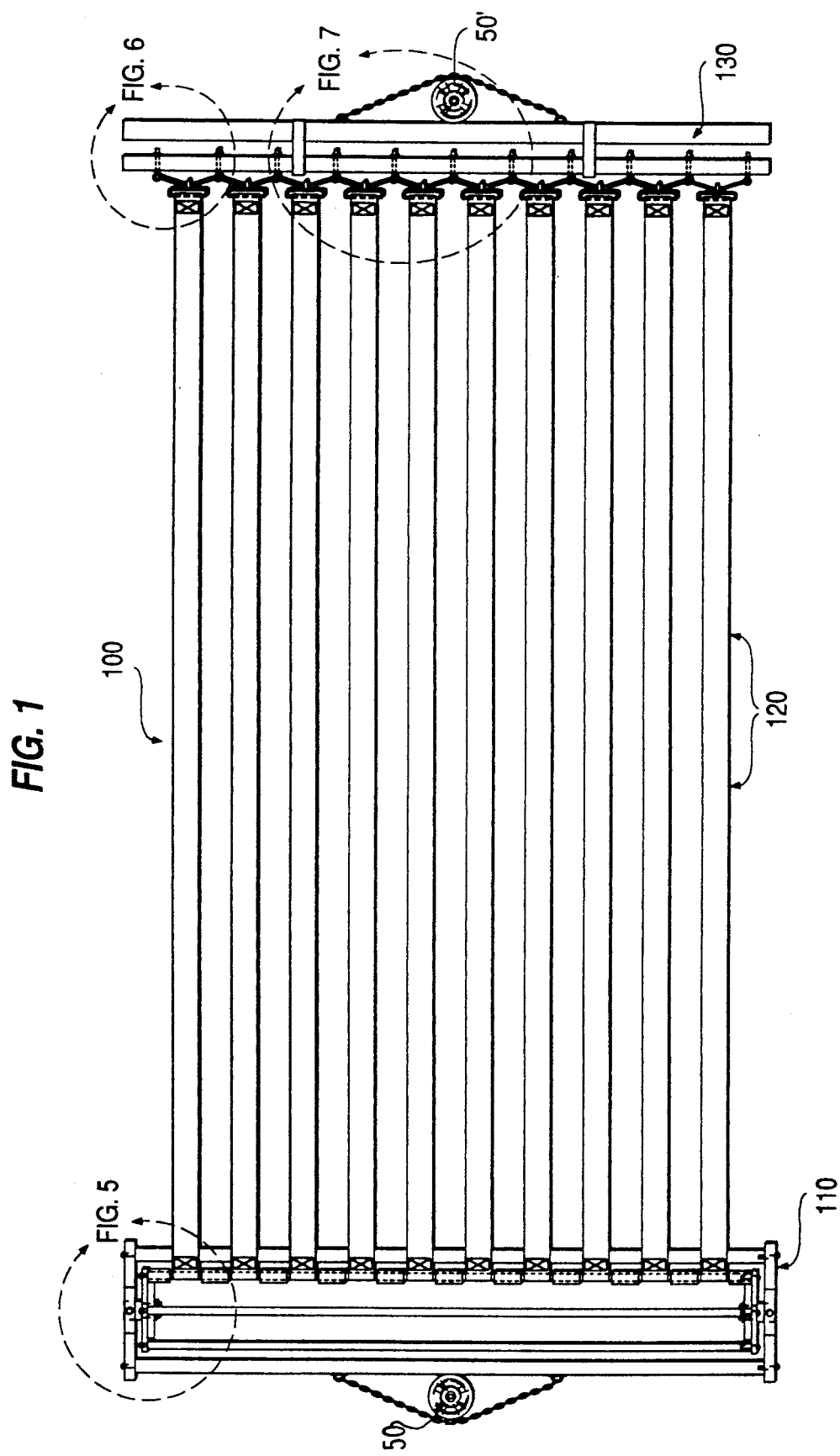

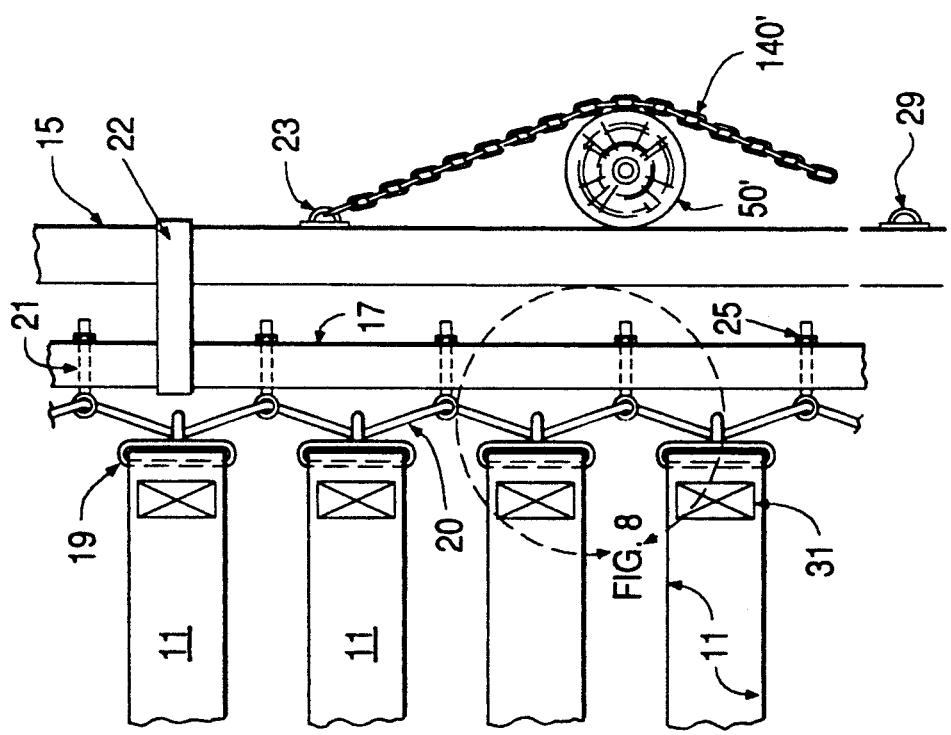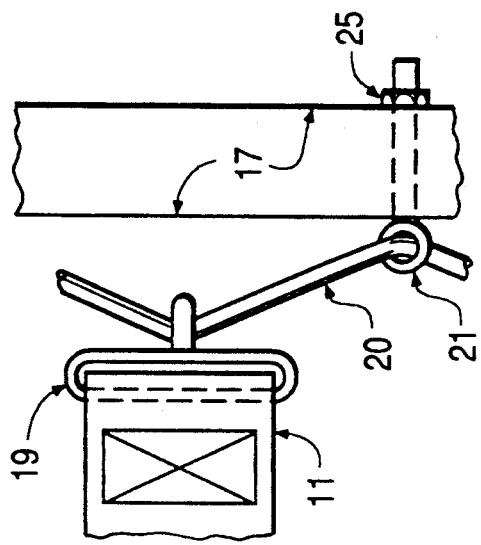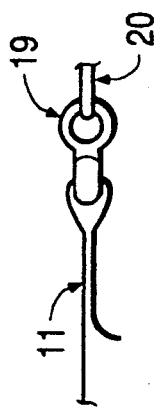

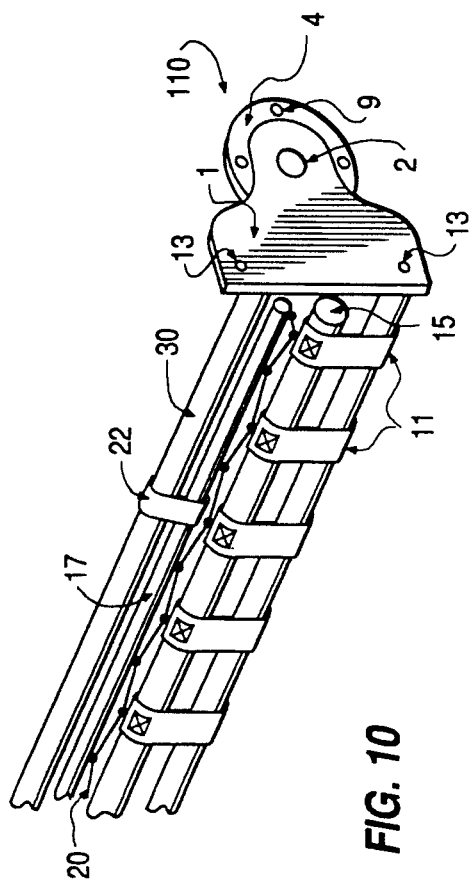
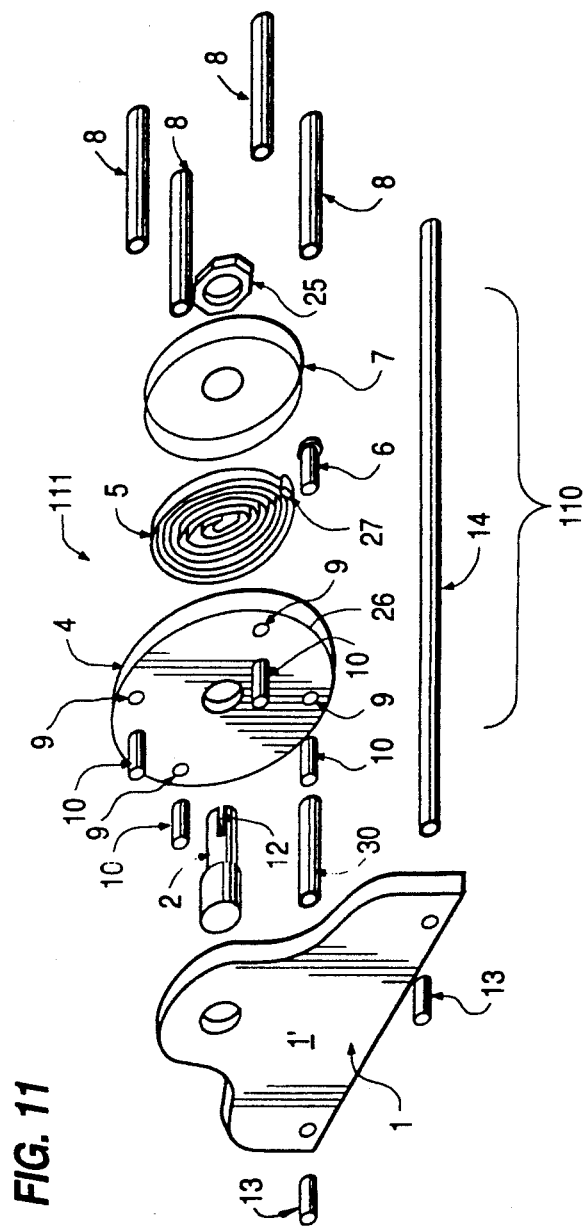
FIG. 10
FIG. 11

SELF RETRACTING PORTABLE CATTLE GUARD

BACKGROUND ART

This application is a continuation-in-part application of co-pending patent application Ser. No. 07/430,009 filed on Nov. 1, 1989, now abandonded, and entitled "SELF-RETRACTING PORTABLE CATTLE GUARD."

As can be seen by reference to the following U.S. Pat. Nos. 2,539,214; 2,710,173; 2,790,626; and 2,800,304; the prior art is replete with myriad and diverse portable cattle guard arrangements.

While all of the aforementioned prior art constructions are more than adequate for the basic purpose and function for which they were designed, these patented devices are uniformly deficient with regard to their failure to provide a cattle guard arrangement that is both compact and portable, as well as providing for the automatic self-retraction and storage of the cattle guard grid.

Obviously, when a rancher needs to employ a portable cattle guard, the device should be very simple to use, easy to install, and be very compact for transport from one location to another.

As a consequence of the foregoing situation, there has existed a longstanding need for a new and improved portable cattle guard that will utilize a self-winding retraction mechanism such that the cattle guard grid will be automatically wound onto a storage reel once the grid has been released from the anchor assembly. The provision of such a construction is a stated objective of the present invention.

DISCLOSURE OF THE INVENTION

A principal objective of this invention is to provide a cattle guard which is easily portable for temporary use in fence openings to allow vehicular passage while controlling livestock movement through the opening.

Another objective is to provide a cattle guard which can be easily installed or removed from a fence opening by one person without equipment.

Another objective of this invention is to provide a cattle guard which can be retracted into a small lightweight package for ease in transporting and storage.

Another objective is to provide a cattle guard which will minimize the risk of injury to livestock in the unlikely event they try to cross the cattle guard.

The present invention meets these objectives by providing a cattle guard which controls livestock movement through the use of a grid made up of a plurality of flexible straps. The grid is supported by two frameworks, one being anchored to each of the opposing sides of a fence opening. The grid straps are held taut by the retracting mechanism which automatically retracts the grid when released from the anchor points on the framework which is attached to the fence on the opposite side of the opening. The taut grid acts to keep the opposing frameworks parallel to each other. The rewind mechanism also acts as storage for the grid when it is not stretched across a roadway. Equal tension is maintained on each grid strap through the use of a leveling device.

The cattle guard can be installed in minutes by following a simple procedure. The retracting mechanism is anchored to the gatepost on one side of the fence opening using chains or other suitable materials. The grid anchor framework is anchored to the opposing gatepost in the same manner. The grid is pulled from the retracting mechanism storage, stretched across the roadway and hooked to the anchoring framework. When the cattle guard is not in use, it can easily be retracted into a very compact unit for transporting by one person or for storage.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a top plan view of the portable cattle guard;

FIG. 7 is an enlarged detail view of that portion of the guard depicted within line 7—7 of FIG. 1;

FIG. 8 is an enlarged detail view of that portion of the guard depicted within line 8—8 of FIG. 7;

FIG. 9 is a side plan view of the structure depicted in FIG. 8;

FIG. 10 is a perspective view of the reel assembly in its retracted storage configuration; and FIG. 11 is an exploded perspective view of the retracting mechanism.

BEST MODE FOR CARRYING OUT THE INVENTION

Figure 2:
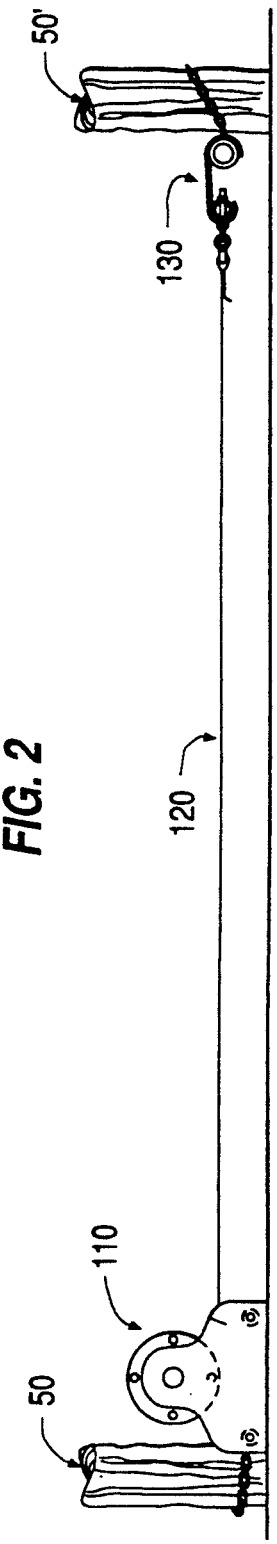
FIG. 2 is a side plan view of the cattle guard.

As can be seen by reference to the drawings, and in particular to FIGS. 1 and 2, the portable cattle guard that forms the basis of the present invention is designated generally by the reference numeral (100). The cattle guard (100) comprises in general a reel mechanism (110) adapted to be secured to one of the posts (50) of a gate opening. A grid (120) operatively connected to one end to the reel mechanism (110) and an anchor assembly (130) adapted to be secured to the other of the posts (50') of the gate opening. The reel mechanism (110) and the anchor assembly (130) is operatively connected to the respective posts (50, 50') by lengths of chain (140, 140').

Turning now to FIG. 11, it can be seen that the retracting mechanism (110) comprises a reel (111) fabricated by bolting four cross rods (8) equally spaced around the perimeter of the two end plates (4) using predrilled holes (9) and screwing the bolts (10) into the threaded ends of three of the cross rods (8).

Prior to bolting the last cross rod (8) to the end plates (4), a spacer (24) is slid onto the cross rod (8) followed by the pre-sewn loop (31) of one of the grid straps (11). This pattern of alternating the spacers (24) with the grid straps (11) is continued across the entire length of the cross rod (8), ending with a shortened version of the spacer (24) at each end. The cross rod (8) is then bolted to the end plates (4).

Self-retracting devices are mounted on both end plates (4). The fabricating procedure is identical for both with one exception; that being the springs (5) would need to be mounted as mirror images with the outer loops (27) of the springs (5) being attached to the end plates (4) between the same two cross rods (8). The end plates (4) have center holes to accept the shouldered shafts (2). The small ends of the shafts are slotted with threads. These shafts (2) are inserted through the center holes of the end plates (4) with the slots (12) toward the center. The springs (5) are slid onto the shafts (2) engaging the center tang of the springs (5) in slots (12). The springs (5) are slid against the end plates and fastened in place by screws (6) inserted through outer loops (27) of the springs (5) and screwed into threaded holes (26). The threaded protective covers (7) are screwed onto the shafts covering the springs and secured in place with lock nuts (25) and tightened, allowing free rotation of the reel.

Figure 6:
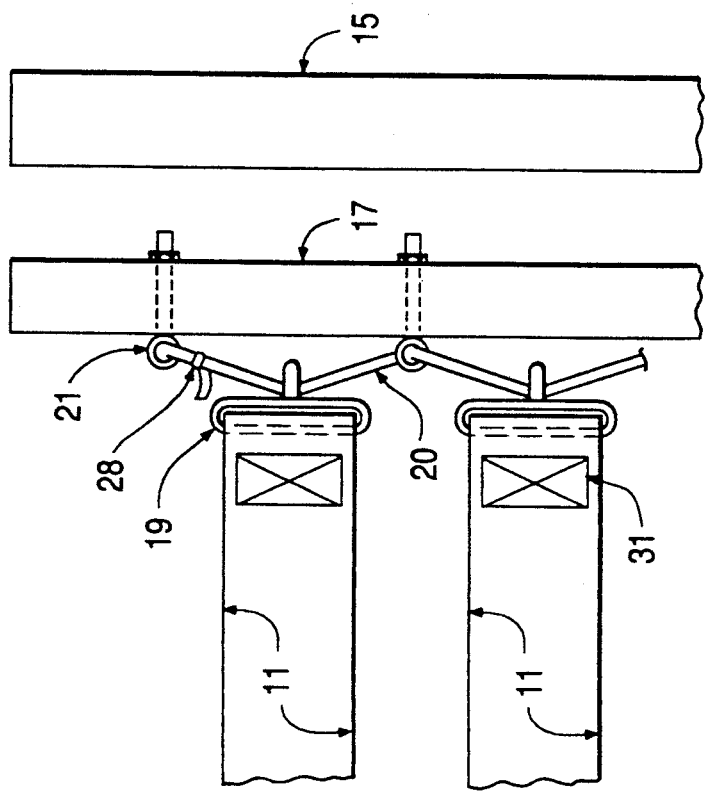
FIG. 6 is a enlarged detail view of that portion of the guard depicted within line 6—6 of FIG. 1.
Figure 5:
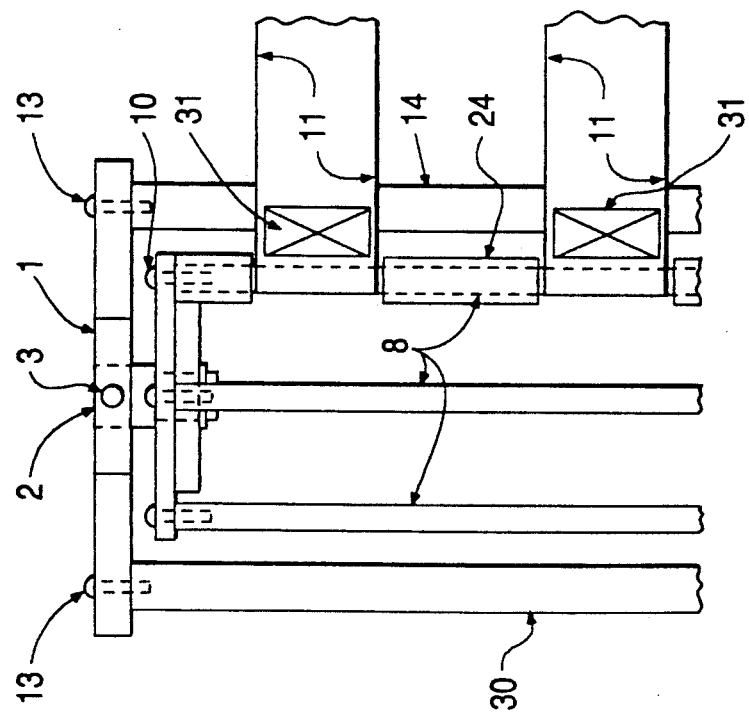
FIG. 5 is an enlarged detail view of that portion of the guard depicted within line 5—5 of FIG. 1.
Figure 3:
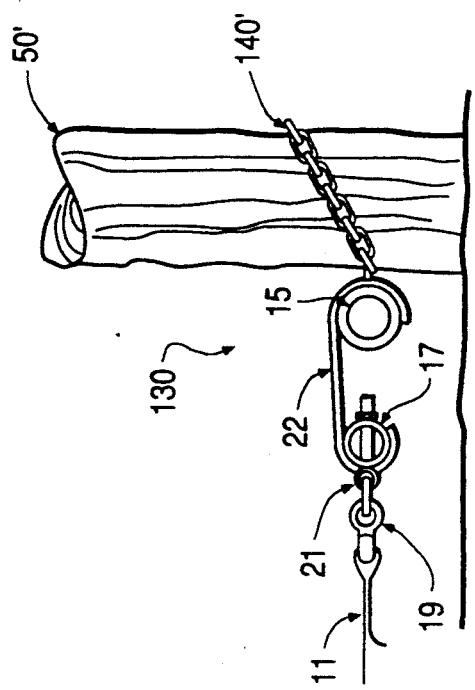
FIG. 3 is an enlarged detail view of the reel assembly.

As can best be seen by reference to FIGS. 5 and 11, the reel mechanism (110) is attached in a support framework comprising a pair of upright reel supports (1'). A cross member (30) with a chain (140) welded to it approximately one-third the length of the cross member (30) from the end to anchor this entire assembly to one of the gate posts (50). One-third the distance in from the opposite end, a latch loop (29) is welded to hold the chain in place when installed and a cross member (14).

The two cross members (30, 14) have threaded holes in both ends to which the two reel supports (1') are fastened utilizing mounting screws (13) in the two bottom holes of the reel supports (1'). The reel is mounted between the two supports (1) by inserting the shafts (2) into the holes in the top of the reel support (1') being sure that the reel is mounted so the spring (5) will contract when the grid (120) which is formed by the plurality of grid straps (11), is pulled from the bottom of the reel. At this point, the grid is wound onto the reel so it can be extended from the bottom of the reel to activate the springs (5). After the grid (120) is wound onto the reel, the set screws (3) are tightened into the threaded holes on top of the reel supports (1). This is done to hold the reel in place and to immobilize the shafts (2) to insure the center tang of the power springs (5) will not rotate.

As shown in FIGS. 6 through 9, the other ends of the grid straps (11) are attached to a self-leveling device which will maintain equal tension on each strap (11) allowing for slight differences in length. This self-leveling device is fabricated by running the free end of the grid straps (11) through strap loops (19), folding the end back and sewing them to secure the strap loop (19) in place. These straps (11) are attached to the grid cross bar (17). Grid cross bar (17) has an eye bolt screwed into threaded holes on either end with eye bolts (21) screwed into threaded holes at locations across the length of the bar which match the center point between the straps (11) on the reel. A wire rope (20) will be fastened to the eye bolt (21) on one end of the grid cross bar (17) with a cable clamp (28). The free end of the wire rope (20) will be inserted through the strap loop (19) of the first strap (11) and then through the next eye bolt (21). This alternating pattern is continued across the entire length of the grid cross bar (17). The wire rope (20) is anchored to the eye bolt (21) on the opposite end with a cable clamp (28). The straps (11) must be threaded on in the same order as they occur on the reel. In addition, the cross bar (17) is further provided with a plurality of hooks for releasably securing the grid (120) to the anchor assembly (130).

Figure 4:
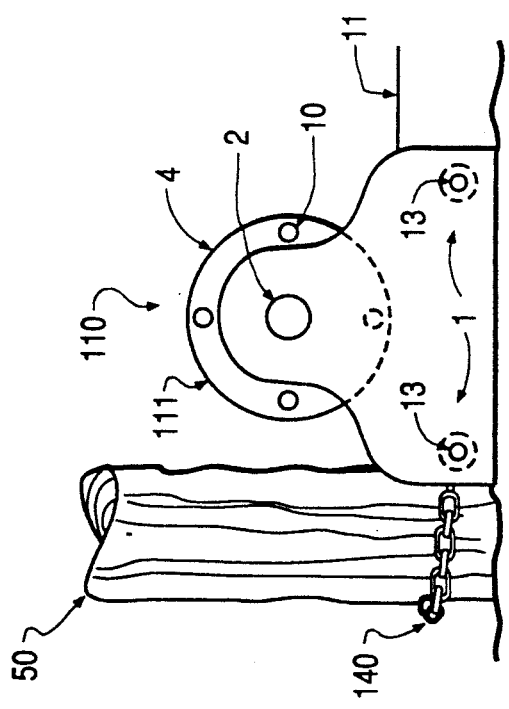
FIG. 4 is an enlarged detail view of the anchoring attachment.

As shown in FIGS. 2, 4 and 7, the anchor assembly for the other side of the fence opening is comprised of an elongated cross piece member (15) identical to the outside cross member (30) on the reel mechanism, with the exception that it has no threaded holes in the ends. Each has a latch (23) and latch (29) for attachment to the post (50').

When cattle guard (100) is retracted for storage, the entire unit can be moved around or stored by one person.

Installation of the package entails opening the gate and placing the reel mechanism (110) of the guard perpendicular to the road with the chain to the outside. The chain (16) is placed around the post (18). Reel mechanism (110) is snugged against the post (50) and the link in the free end of the chain (14) is locked to the latch (29) with a pad lock. The anchoring cross member is fastened to the opposing gate post (50') in the same manner. The grid (120) is then pulled from the storage reel and attached to the anchoring cross piece member (15) with the plurality of hooks (22). The spring tension on the grid will hold the two opposing anchoring devices parallel to each other.

The foregoing procedure is reversed for removal of the portable cattle guard. The grid is unhooked from the anchoring cross member (5) and allowed to rewind onto the reel. The chains are released and the unit packaged for transporting. Packaging is done by laying the reel mechanism down with the grid side up. The anchoring cross member is layed along the bottom side of the framework. The grid is brought around the bottom and is attached to the back cross member (30) of the reel mechanism with hooks (22).

The self retracting nature of the grid and storage potential of the reel mechanism (110) offers a lightweight, portable cattle guard which can be installed in five minutes or less and will discourage livestock from attempting to cross while allowing wheeled vehicle's passage through the gate. The portability of the unit allows for the ease of installation and removal of the unit without equipment. The compact packaging allows for ease in transportation and storage of the cattle guard. The flexible grid (120) will also minimize the potential of injury to livestock.

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A self retracting, portable cattle guard for use in combination with a pair of spaced gate posts for preventing cattle from passing between the space between the two gate posts which define a gate opening; wherein, the cattle guard comprises:

an elongated reel mechanism adapted to be releasably secured to one of said gate posts and including a rotatable reel;

a grid comprising a plurality of relatively widely spaced, flexible, grid straps operatively attached on one end to said reel mechanism and operatively connected on the other end to an elongated cross bar;

an elongated anchor assembly adapted to be releasably secured to the other of said gate posts and including an elongated cross piece member;

spring means operatively associated with said reel for biasing said grid into a retracted relationship relative to said reel; and a plurality of hooks operatively associated with said cross piece member and said cross bas for releasably connecting the grid to the anchor assembly; wherein said plurality of hooks are secured to said cross bar at spaced locations.

2. The cattle guard as in claim 1 wherein a self leveling mechanism is disposed intermediate the said other end of the plurality of grid straps and said cross bar.

* * * * *